(12) United States Patent
Takahashi

(10) Patent No.: US 10,955,655 B2
(45) Date of Patent: Mar. 23, 2021

(54) STITCHING IMAGES BASED ON PRESENCE OF FOREIGN MATTER

(71) Applicant: Sony Corporation, Tokyo (JP)

(72) Inventor: Masahiro Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 499 days.

(21) Appl. No.: 14/405,048

(22) PCT Filed: Apr. 26, 2013

(86) PCT No.: PCT/JP2013/062407
§ 371 (c)(1),
(2) Date: Dec. 2, 2014

(87) PCT Pub. No.: WO2014/006964
PCT Pub. Date: Jan. 9, 2014

(65) Prior Publication Data
US 2015/0124078 A1    May 7, 2015

(30) Foreign Application Priority Data
Jul. 4, 2012 (JP) .............................. JP2012-150566

(51) Int. Cl.
*G06K 9/00* (2006.01)
*G02B 21/36* (2006.01)
(Continued)

(52) U.S. Cl.
CPC .......... *G02B 21/367* (2013.01); *G06T 3/4038* (2013.01); *G06T 7/0012* (2013.01);
(Continued)

(58) Field of Classification Search
None
See application file for complete search history.

(56) References Cited

U.S. PATENT DOCUMENTS 6,091,842 A * 7/2000 Domanik ........... G01N 15/1468
250/201.3
6,215,892 B1 * 4/2001 Douglass ............... G01N 1/312
382/128
(Continued)

FOREIGN PATENT DOCUMENTS

EP    1008956 A1    6/2000
EP    1830217 A1    9/2007
(Continued)

OTHER PUBLICATIONS

Extended European Search Report of EP Patent Application No. 13813211.3, dated Jul. 4, 2017, 07 pages.
(Continued)

*Primary Examiner* — Soo Jin Park
(74) *Attorney, Agent, or Firm* — Chip Law Group

(57) ABSTRACT

There are provided an information processing apparatus, an information processing method, a program, and a microscope system which can compose a microscopically observed image having a wide field of view and a high resolution by highly accurately stitching a plurality of digital images together.
An image acquisition unit provided in the information processing apparatus acquires a first partial image and a second partial image each formed by imaging a part of an observation target area, and a stitching position adjustment unit adjusts a stitching position of the second partial image with respect to the first partial image. The image acquisition unit controls drive of the microscope such that a partial image including a specimen is acquired as the second partial image when the first partial image includes a foreign matter.

41 Claims, 18 Drawing Sheets

(51) Int. Cl.
*G06T 3/40* (2006.01)
*G06T 7/00* (2017.01)

(52) U.S. Cl.
CPC ............... *G06T 2207/10056* (2013.01); *G06T 2207/20076* (2013.01)

(56) References Cited

U.S. PATENT DOCUMENTS

| | | | | |
|---|---|---|---|---|
| 6,687,419 | B1* | 2/2004 | Atkin | G06T 11/00 358/450 |
| 6,718,053 | B1* | 4/2004 | Ellis | G01N 15/1475 345/604 |
| 7,016,109 | B2* | 3/2006 | Nakagawa | G02B 21/367 359/380 |
| 7,212,660 | B2* | 5/2007 | Wetzel | G06K 9/00127 382/128 |
| 7,792,338 | B2* | 9/2010 | Bacus | G02B 21/367 382/128 |
| 7,885,447 | B2* | 2/2011 | Oshiro | G06K 9/0014 382/133 |
| 8,472,692 | B2* | 6/2013 | Rughani | G02B 21/244 348/79 |
| 8,625,928 | B2* | 1/2014 | Fukushi | G06T 7/32 382/284 |
| 8,655,043 | B2* | 2/2014 | Dixon | G01N 21/6428 382/128 |
| 8,712,116 | B2* | 4/2014 | Gouch | G02B 21/002 348/79 |
| 9,110,306 | B2* | 8/2015 | Hayashi | G06K 9/00134 |
| 2004/0202357 | A1* | 10/2004 | Perz | G06K 9/0014 382/128 |
| 2005/0123181 | A1* | 6/2005 | Freund | G02B 21/365 382/128 |
| 2005/0190437 | A1* | 9/2005 | Nakagawa | G02B 21/367 359/381 |
| 2007/0269085 | A1* | 11/2007 | Oshiro | G02B 21/365 382/128 |
| 2011/0249910 | A1* | 10/2011 | Henderson | G06K 9/00134 382/278 |
| 2011/0316999 | A1 | 12/2011 | Yoneyama et al. | |
| 2013/0077892 | A1* | 3/2013 | Ikeno | G02B 21/367 382/286 |

FOREIGN PATENT DOCUMENTS

| | | |
|---|---|---|
| EP | 2402813 A2 | 1/2012 |
| JP | 11-249021 | 9/1999 |
| JP | 11-249021 A | 9/1999 |
| JP | 2000-295462 A | 10/2000 |
| JP | 2000-295462 A | 10/2000 |
| JP | 2000295462 A * | 10/2000 |
| JP | 2004-101871 A1 | 4/2004 |
| JP | 2004-343222 A | 12/2004 |
| JP | 2004-343222 A | 12/2004 |
| JP | 2005-241872 A1 | 9/2005 |
| JP | 2006-284965 | 10/2006 |
| JP | 2006-284965 A | 10/2006 |
| JP | 2011-065371 A | 3/2011 |
| JP | 2011-118107 | 6/2011 |
| JP | 2011-118107 A | 6/2011 |
| JP | 2012-003197 A | 1/2012 |

OTHER PUBLICATIONS

Appleton, et al., "Towards Optimal Image Stitching for Virtual Microscopy", Proceedings of the Digital Imaging Computing: Techniques and Applications (DICTA 2005), IEEE Computer Society, 2005, 08 pages.

Rankov, et al., "An Algorithm for Image Stitching and Blending", Proceedings of SPIE—vol. 5701, Three-Dimensional and Multidimensional Microscopy: Image Acquisition and Processing XII, Mar. 2005, pp. 190-199.

Office Action for JP Patent Application No. 2017-131773, dated May 15, 2018, 09 pages of Office Action and 03 pages of English Translation.

Office Action for JP Patent Application No. 2018-224364, dated Sep. 17, 2019, 04 pages of Office Action and 03 pages of English Translation.

* cited by examiner

A

| 0 | 0 | 1 | 1 | 0 |
|---|---|---|---|---|
| 0 | 2 | 2 | 2 | 1 |
| 1 | 2 | 2 | 2 | 2 |
| 1 | 2 | 2 | 2 | 1 |
| 0 | 1 | 2 | 0 | 0 |

B

STITCHING IMAGES BASED ON PRESENCE OF FOREIGN MATTER

TECHNICAL FIELD

The present technology relates to an information processing apparatus which processes image information imaged by a microscope, an information processing method, a program provided to execute information processing, and a microscope system which includes the information processing apparatus. More specifically, the present invention relates to a technology of split-imaging an observation target area, stitching together a plurality of partial images obtained, and composing a microscopic image having a wide field of view.

BACKGROUND ART

In order to obtain a microscopically observed image having a wide field of view as well as high magnification in the field of medicine, pathology, biology, material and the like, there is used a technology of split-imaging an observation target area by a digital microscope and stitching together a plurality of partial images obtained. A virtual microscope system using this technology allows a user to display an arbitrary position in the obtained microscopically observed image with an arbitrary magnification and to display the image in a remote location through a network, and thus attracts attention particularly for use in tissue/cell examination in a pathological diagnosis.

In order to obtain a microscopically observed image that has a high resolution, on the other hand, the virtual microscope system may image the observation target area while splitting the area into smaller sections. However, as the number of partial images increases, imaging and stitching processing need to be performed with higher accuracy. Accordingly, there has been conducted a variety of studies for the virtual microscope system to obtain a high-quality microscopically observed image in a short time.

Patent Document 1 for example proposes a microscope system which includes a processor generating a partial image separately from a processor performing stitching processing, for the purpose of cutting down the processing time. Moreover, Patent Document 2 proposes a microscope apparatus which detects misregistration when imaging a partial image to prevent an error caused by imaging misregistration at the time of scanning, and corrects a stitching position in each partial image on the basis of the detected result.

CITATION LIST

Patent Document

Patent Document 1: JP 2011-118107 A
Patent Document 2: JP 2006-284965 A

SUMMARY OF THE INVENTION

Problems to be Solved by the Invention

The conventional virtual microscope system described above stitches together the partial images that are determined to have a high correlation with each other in matching processing, but it is not always the case that stitching of the partial images having a high correlation with each other realizes the correct stitching. Specifically, there is a case where stitching is performed incorrectly due to a foreign matter such as dirt which is included in the partial image besides a specimen and is determined to have a higher correlation than the specimen does. This problem is more likely to occur particularly when an edge of a cover glass is present on the specimen.

Therefore, a main object of the present disclosure is to provide an information processing apparatus, an information processing method, a program, and a microscope system which can compose a microscopically observed image having a wide field of view and a high resolution by highly accurately stitching images together even when an image of a foreign matter is included in a plurality of digital images.

Solutions to Problems

The information processing apparatus according to the present disclosure includes: an image acquisition unit which acquires a first partial image and a second partial image each formed by imaging a part of an observation target area; and a stitching position adjustment unit which adjusts a stitching position between the first partial image and the second partial image, wherein the image acquisition unit acquires a partial image including a specimen as the second partial image when a foreign matter is included in the first partial image.

The information processing apparatus according to the present disclosure performs processing of preferentially stitching the partial image including the foreign matter to the partial image including the specimen even when the foreign matter is included in the observation target area. This allows a shift in a stitching position caused at the time of the stitching processing to be prevented and thus allows stitching accuracy to be improved.

The information processing apparatus may be provided with an imaging order generation unit which generates an imaging order of the partial image on the basis of a whole image formed by imaging the entire observation target area with a lower magnification than the partial image, wherein the imaging order generation unit selects an area including a specimen as a second area imaged after a first area when a foreign matter is included in the first area of the whole image that is divided into a plurality of areas, and the image acquisition unit may acquire the first partial image and the second partial image according to the imaging order generated by the imaging order generation unit.

Moreover, the image acquisition unit may acquire the second partial image to be stitched to the first partial image from a plurality of the partial images each formed by imaging a part of the observation target area, while the stitching position adjustment unit may adjust a stitching position of the second partial image with respect to the first partial image.

The image acquisition unit may further acquire a partial image not including a foreign matter as the second partial image.

The image acquisition unit may also acquire a partial image including a foreign matter as the second partial image when none of the partial images formed by imaging an area adjacent to an imaging area of the first partial image includes a specimen.

The image acquisition unit may also be configured not to acquire, as the second partial image, a partial image including a foreign matter which is stitched to a partial image including a foreign matter.

The information processing apparatus may be further provided with an image analysis unit which determines whether or not a foreign matter and a specimen are present in the partial image.

The image analysis unit determines whether or not the foreign matter and the specimen are present in the each area of the whole image to be able to make a determination on a corresponding partial image on the basis of a result of the determination.

In this case, the image analysis unit may determine whether or not the foreign matter and the specimen are present by using two types of whole images having the same field of view but different imaging conditions.

The image analysis unit may further calculate a first likelihood indicating a degree of presence of the specimen and a second likelihood calculating a probability of presence of the foreign matter for each area in the whole image.

In this case, the image analysis unit can also create a presence map indicating presence information on the specimen and the foreign matter, on the basis of the first likelihood and the second likelihood.

Furthermore, the information processing apparatus may be provided with an image composition unit which stitches together the first partial image and the second partial image.

In this case, the image acquisition unit may acquire as the second image an arbitrary partial image from among the partial images when none of the partial images formed by imaging the area adjacent to the imaging area of the first partial image includes the specimen nor the foreign matter, and the image composition unit may stitch the second partial image to the first partial image on the basis of position information of the acquired partial image at the time of imaging.

The image acquisition unit may also be configured not to acquire, as the second partial image, a partial image which is stitched on the basis of the position information.

The information processing method according to the present disclosure includes: an image acquisition step in which an image acquisition unit acquires a first partial image and a second partial image each formed by imaging a part of an observation target area; and a stitching position adjustment step in which a stitching position adjustment unit adjusts a stitching position between the first partial image and the second partial image, wherein, in the image acquisition step, a partial image including a specimen is acquired as the second partial image when a foreign matter is included in the first partial image.

The program according to the present disclosure causes the information processing apparatus to execute: an image acquisition function of acquiring a first partial image and a second partial image such that a partial image including a specimen is acquired for a partial image including a foreign matter; and a stitching position adjustment function of adjusting a stitching position between the first partial image and the second partial image.

The microscope system according to the present disclosure includes at least: a microscope apparatus including at least a whole image imaging unit which images a whole observation target area and a partial image imaging unit which images a part of the observation target area with a higher magnification than the whole image; and an information processing apparatus which controls the microscope apparatus as well as processes each image imaged by the microscope apparatus, wherein the information processing apparatus is provided with an image acquisition unit which acquires a first partial image and a second partial image each formed by imaging a part of the observation target area and a stitching position adjustment unit which adjusts a stitching position between the first partial image and the second partial image, the image acquisition unit acquiring a partial image including a specimen as the second partial image when a foreign matter is included in the first partial image.

Effects of the Invention

According to the present disclosure, a microscopically observed image having the wide field of view and high resolution can be composed by stitching together a number of partial images with high accuracy to prevent the shift in the stitching position, even when the image of the foreign matter is present.

MODES FOR CARRYING OUT THE INVENTION

Modes for carrying out the present disclosure will now be described in detail with reference to the drawings. Note that the present disclosure is not to be limited to each embodiment illustrated below. Moreover, the description will be provided in the following order.

1. First embodiment
(An example of a system which preferentially stitches an image including a foreign matter to an image including a specimen)
2. Second embodiment
(An example of a system which creates an imaging sequence)

1. First Embodiment

Configuration of Microscope System

Figure 1:
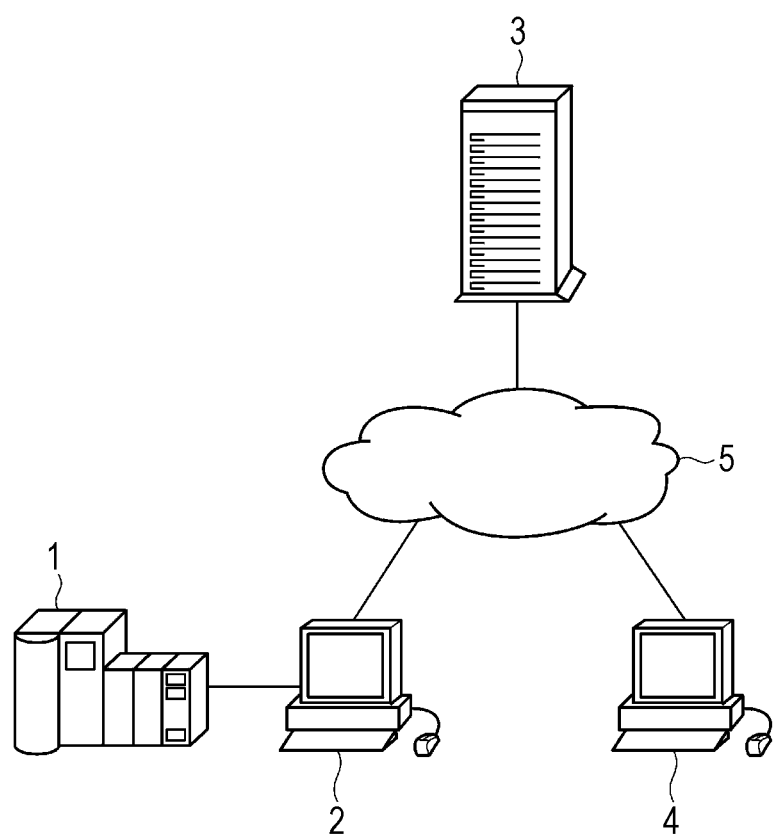
FIG. 1 is a diagram illustrating an overview of a microscope system according to first embodiment of the present disclosure.

First, there will be described a virtual microscope system according to first embodiment of the present disclosure. FIG. 1 is a diagram illustrating an overview of a microscope system according to the present embodiment. The microscope system of the present embodiment is configured to image various prepared specimens with a high magnification to observe the specimens and includes at least a digital microscope 1 and an information processing apparatus 2 as illustrated in FIG. 1.

The information processing apparatus 2 is provided with at least an image acquisition unit 233 which acquires a first partial image and a second partial image each formed by imaging a part of an observation target area, and a stitching position adjustment unit 234 which adjusts a stitching position between the first partial image and the second partial image. The image acquisition unit 233 preferentially acquires, as the second partial image, a partial image including a specimen when the first partial image includes a foreign matter.

The microscope system of the present embodiment may also be provided with a server 3 and/or an image display device 4. In that case, the information processing apparatus 2, the server 3, and the image display device 4 can be connected directly but can also be connected through a network 5 to be able to communicate with one another.

[Digital Microscope 1]

Figure 2:
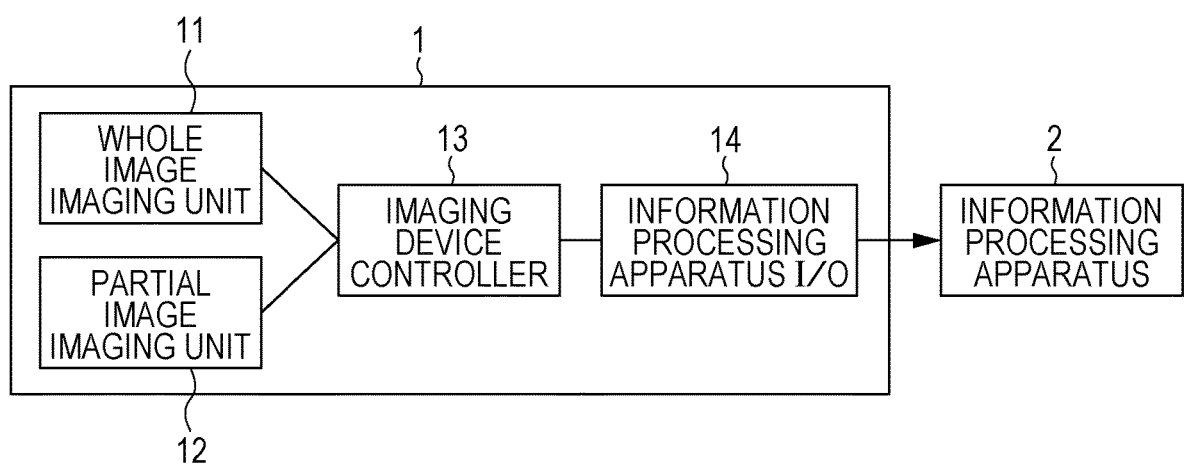
FIG. 2 is a block diagram illustrating an example of a configuration of a digital microscope 1 illustrated in FIG. 1.

The digital microscope 1 includes a light source, an objective lens, an imaging element and a stage, irradiates a prepared specimen mounted on the stage with predetermined illumination light, and images light transmitted through an observation target or light emitted from the observation target. FIG. 2 is a block diagram illustrating an example of a configuration of the digital microscope 1. As illustrated in FIG. 2, the digital microscope 1 included in the microscope system of the present embodiment is provided with a whole image imaging unit 11 and a partial image imaging unit 12.

The whole image imaging unit 11 includes a light source, a low magnification objective lens, a low resolution imaging element and the like to image an entire observation target area of the prepared specimen mounted on the stage with low magnification and low resolution. Here, the whole image imaging unit 11 images two types of whole images that have the same field of view but different imaging conditions. In this case, the whole image imaging unit 11 is provided with two types of light sources including a light source emitting bright-field illumination light and a light source emitting dark-field illumination light, for example. The whole image imaging unit 11 may also be provided with an illumination control unit which determines whether to execute a mode to acquire a bright-field image or a mode to acquire a dark-field image. The illumination control unit sets to the light source a parameter corresponding to each mode, thereby allowing the light source to emit illumination light that is suited for each mode.

When the bright-field illumination is used in the whole image imaging unit 11, for example, light can be emitted to the preparation from below the preparation on which a specimen is mounted (from a side opposite to the imaging element relative to the preparation). As a result, an image of the specimen and the foreign matter such as a cover glass present in a light transmitting area on the preparation can be acquired.

When the dark-field illumination is used in the whole image imaging unit 11, on the other hand, the preparation is illuminated from an upper side, for example. Here, one can acquire from an image imaged by the imaging element a piece of information about a portion where light is scattered on the preparation. The scattering of light occurs at an edge of a cover glass, for example, so that the edge of the cover glass mounted to cover the specimen on the preparation appears in white in the dark-field image, for example. The whole image imaging unit 11 can thus acquire the image in which the edge of the cover glass stands out. Accordingly, the whole image imaging unit 11 can acquire the two types of whole images including the bright-field image and the dark-field image.

The partial image imaging unit 12 includes a light source, an objective lens having higher magnification than the whole image imaging unit 11, a high resolution imaging element and the like to image apart of the observation target area of the prepared specimen mounted on the stage with high magnification and high resolution. That is, the digital microscope 1 images the low resolution whole image (thumbnail image) and the partial image (slide image) that has higher resolution than the whole image.

The digital microscope 1 may also be provided with an imaging device controller 13 which controls the imaging processing performed by the whole image imaging unit 11 and the partial image imaging unit 12, and an input/output interface 14 which connects the microscope to the information processing apparatus 2. The input/output interface 14 is provided to allow a control command to be input from the information processing apparatus 2 as well as allow each image data imaged by the whole image imaging unit 11 and the partial image imaging unit 12 to be output to the information processing apparatus 2.

[Information Processing Apparatus 2]

Figure 3:
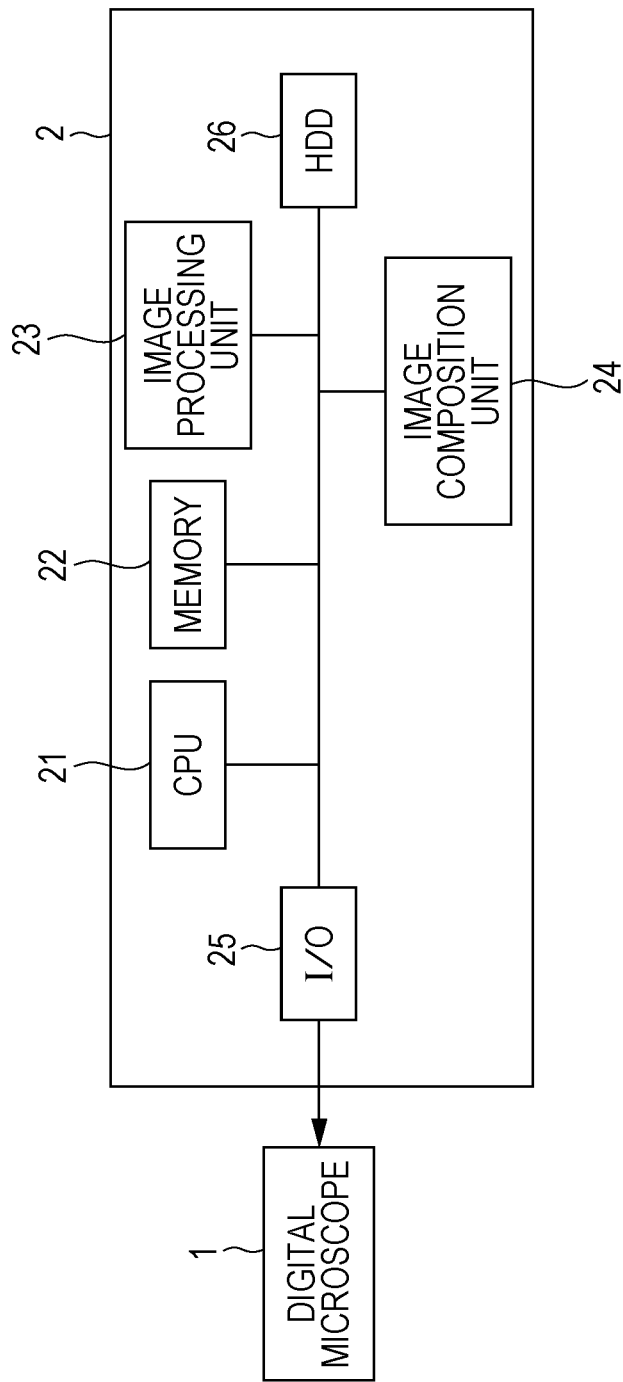
FIG. 3 is a block diagram illustrating an example of a configuration of an information processing apparatus 2 illustrated in FIG. 1.

FIG. 3 is a block diagram illustrating an example of a configuration of the information processing apparatus 2. The information processing apparatus 2 includes an image processing unit 23 which processes each image imaged by the digital microscope 1. The information processing apparatus 2 may also be provided with a CPU (Central Processing Unit) 21, a memory 22, an image composition unit 24, an input/output interface 25, and a hard disk 26.

(Image Processing Unit 23)

Figure 4:
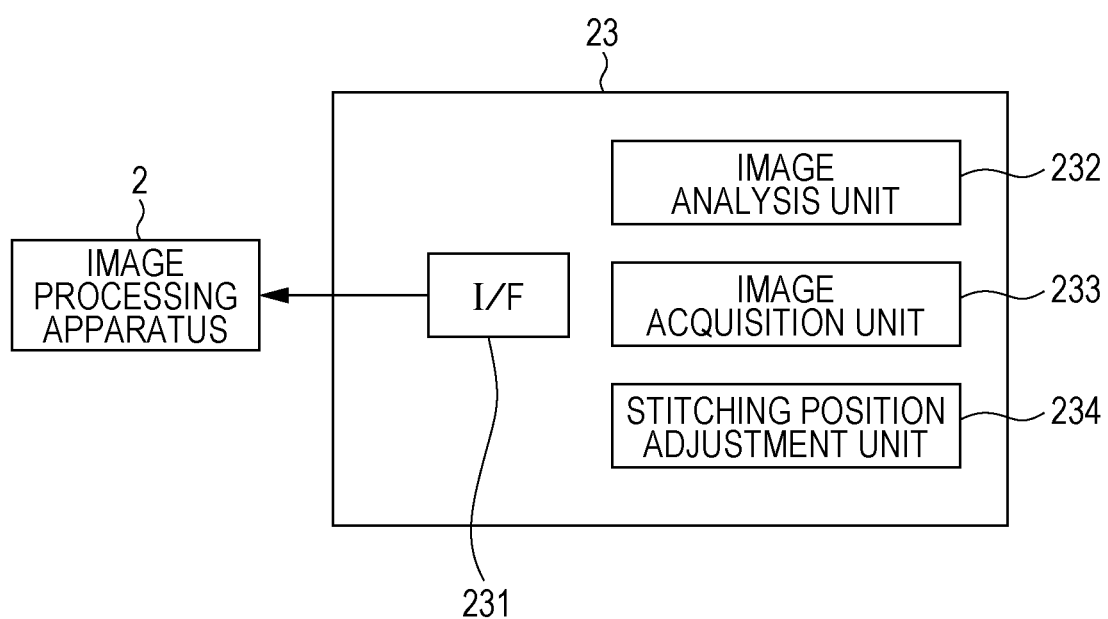
FIG. 4 is a block diagram illustrating an example of a configuration of an image processing unit 23 illustrated in FIG. 3.

FIG. 4 is a block diagram illustrating an example of a configuration of the image processing unit 23. As illustrated in FIG. 4, the image processing unit 23 may be provided with an image analysis unit 232 which analyzes the whole image (thumbnail image) formed by imaging the entire observation target area.

The image analysis unit 232 determines whether or not a foreign matter and a specimen are present in each area of the whole image formed by imaging the entire observation target area. The image analysis unit 232 can determine whether or not the foreign matter and the specimen are present by dividing each of the two types of whole images having the same field of view but different imaging conditions into a plurality of areas and comparing the two types of whole images, for example. Note that the "foreign matter" in this case indicates the edge of the cover glass covering the specimen or dirt mixed in the specimen, and the image analysis unit 232 determines the presence of the foreign matter in the partial image.

Although not particularly limited, a method of calculating a likelihood indicating a possibility that the foreign matter and the specimen are present in each area, for example, can be adopted as the method performed by the image analysis unit 232 to determine whether or not the observation target is present. Note that the "likelihood" in this case includes not only the probability of the presence of the observation target but also the concept of whether or not the observation target is present.

More specifically, the likelihood can be adopted to classify each area of the bright-field image of the whole image into three levels including an area in which the observation target is present (level 2), an area in which the observation target may be present (level 1), and an area in which the observation target is not present (level 0), for example. Moreover, each area of the dark-field image of the whole image can be classified into two levels including an area in which the foreign matter is present (level 1) and an area in which the foreign matter is not present (level 0), for example. The image analysis unit 232 can determine the presence of the specimen and the foreign matter by comparing the likelihood pertaining to the bright-field image and the dark-field image.

The image processing unit 23 is further provided with the image acquisition unit 233 which acquires the first partial image and the second partial image each formed by imaging a part of the observation target area. The image acquisition unit 233 can acquire the second partial image as a partial image to be stitched to the first partial image from among the plurality of partial images formed by imaging a part of the observation target area, for example. The image acquisition unit 233 preferentially acquires, as the second partial image, a partial image including the specimen when the first partial image includes the foreign matter.

The image processing unit 23 is further provided with the stitching position adjustment unit 234. The stitching position adjustment unit 234 performs adjustment (matching processing) of the stitching position between the partial images selected by the image acquisition unit 233 to be stitched together.

Although not particularly limited, a method of adjusting the stitching position by the stitching position adjustment unit 234 is performed by calculating a brightness value for each of a plurality of pixels of an area to be stitched (marginal area for stitching) to each of the partial images and calculating an autocorrelation function on the basis of the brightness value, for example. The stitching position may also be adjusted by calculating a square of the difference in the brightness value for each pixel of the overlapping area. In addition, a variety of algorithms used in image pattern matching can be used.

(CPU 21)

The CPU 21 has control over each unit provided in the information processing apparatus 2 and executes a program which exercises control over the aforementioned image processing unit 23, for example. The CPU 21 can also perform arithmetic processing executed by each unit of the information processing apparatus 2, image encoding, and pattern matching processing of the partial image that is executed by the image composition unit 24 to be described later.

(Memory 22)

The memory 22 is used as a work area of the CPU 21 and temporarily stores the partial image (slide image) and the whole image (thumbnail image) that are imaged by the digital microscope 1 and input from the input/output interface 25.

(Image Composition Unit 24)

The image composition unit 24 stitches together the plurality of partial images (slide images) imaged by the digital microscope 1 and composes a wide-field microscopically observed image having the high magnification and high resolution. The partial image (slide image) is input one by one to the image composition unit 24 through the input/output interface 25. The partial image (slide image) is then subjected to the matching processing in the order the image is imaged, followed by the stitching processing based on the result of the matching processing.

Here, in the microscope system of the present embodiment, an image including the specimen is preferentially acquired as a partial image to be stitched to a partial image including a foreign matter when there exists the partial image including the foreign matter. This prevents partial images including the foreign matter from being stitched together, thereby preventing a shift in the stitching position and improving the stitching accuracy.

(Hard Disk 26)

Stored in the hard disk 26 includes a result of the processing performed by the image processing unit 23 (such as the likelihood, a presence level, a presence map, and the imaging order of each area) as well as the wide-field microscopically observed image that is composed by the image composition unit 24, for example.

Note that a part or all of these data can be stored in the server 3 on the network 5 as well. In that case, the information processing apparatus 2 may be provided with an interface (not shown) to connect to the server 3 so that mutual communication is enabled through the network 5.

Moreover, a computer program which realizes each function of the aforementioned information processing apparatus 2 can be created and included in a personal computer or the like. Such computer program may be stored in a recording medium such as a magnetic disk, an optical disk, a magneto-optical disk, or a flash memory or can be distributed through a network, for example.

[Server 3]

The server 3 manages various data uploaded from the information processing apparatus 2 and outputs the data to the image display device 4 and the information processing apparatus 2 in response to a request. Moreover, the server 3 creates a GUI (Graphical User Interface) to be used by a user of the image display device 4 for an image that can be viewed on the image display device 4.

[Image Display Device 4]

The image display device 4 displays the partial image (slide image) output from the server 3 or the information processing apparatus 2 and the wide-field microscopically observed image that is formed by composing the plurality of partial images (slide images). When the prepared specimen is a pathology specimen, for example, the user of the image display device 4 (a viewer of the image) is a doctor who makes a pathological diagnosis on the basis of the image being displayed.

[Network 5]

The network 5 is a communication network which connects the information processing apparatus 2, the server 3, and the image display device 4 to be able to perform bidirectional communication with one another. The network 5 is configured by a public network such as the Internet, a telephone network, a satellite communication network, and a broadcast communication channel and a leased line network such as a WAN (Wide Area Network), a LAN (Local Area Network), an IP-VPN (Internet Protocol-Virtual Private Network), an Ethernet (registered trademark), and a wireless LAN, and can be either wired or wireless. The network 5 may also be a communication network specifically provided for the microscope system of the present embodiment.

[Operation]

Figure 5:
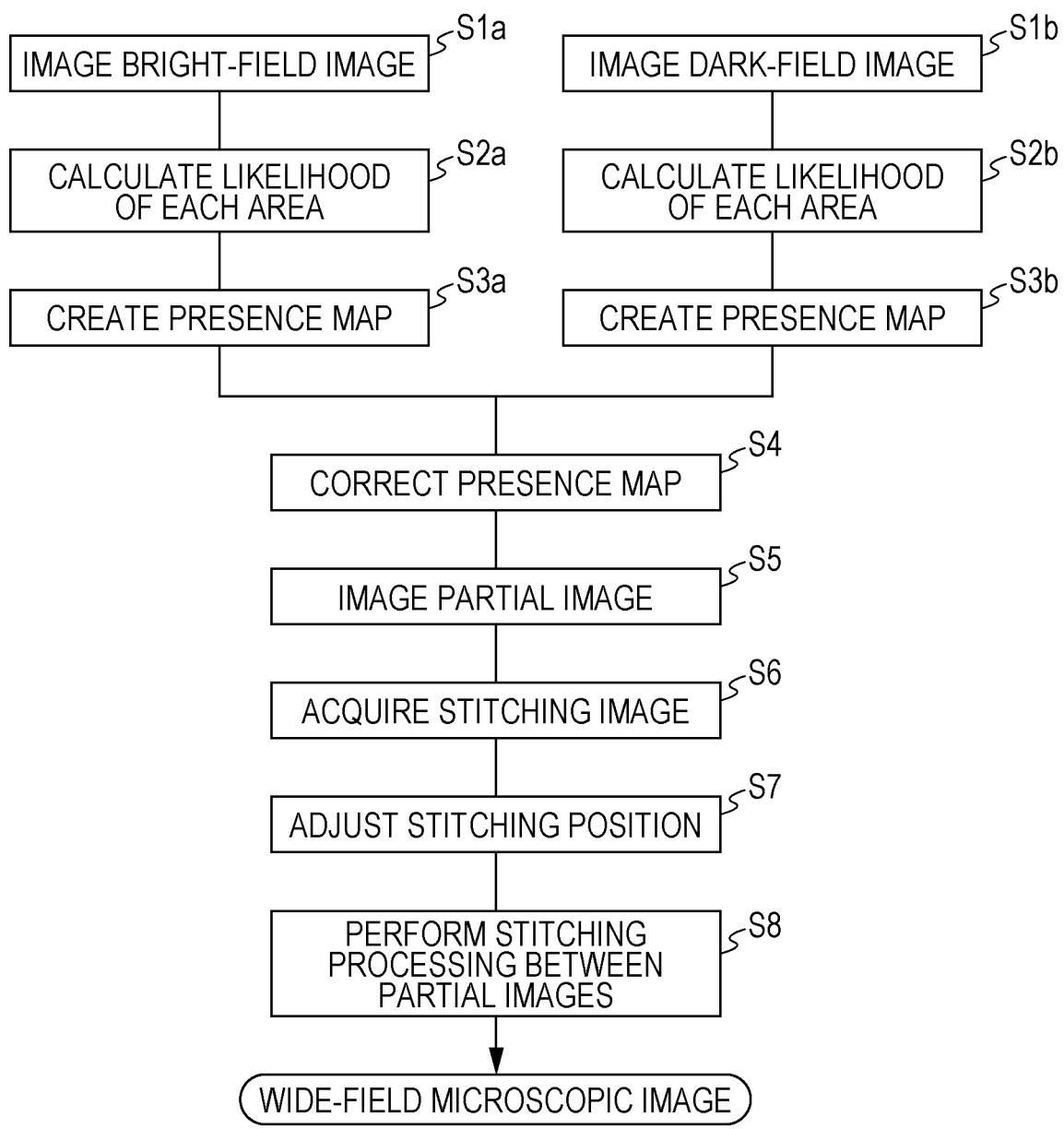
FIG. 5 is a flowchart illustrating an overview of an overall operation of the microscope system according to the first embodiment of the present disclosure.

Next, an example of the operation of the microscope system according to the present embodiment will be described. FIG. 5 is a flowchart illustrating an overview of an overall operation of the microscope system according to the present embodiment.

When an object is to be microscopically observed by the microscope system of the present embodiment, the whole image imaging unit 11 of the digital microscope 1 first images the entire observation target area of the prepared specimen mounted on the stage with the low magnification and low resolution (step S1a), as illustrated in FIG. 5. The whole image (bright-field image) imaged in step S1a is output from the interface 14 of the digital microscope 1 and input to the image processing unit 23 through the interface 25 of the information processing apparatus 2.

The image analysis unit 232 of the image processing unit 23 then divides a first whole image (thumbnail image) being input into a plurality of areas and determines whether or not the observation target is present in each area by a method of calculating a likelihood, for example (step S2a). The likelihood in each area can be calculated by image recognition processing, for example. The image analysis unit 232 then creates a presence map indicating presence information on the observation target on the basis of the likelihood in each area (step S3a).

Moreover, the whole image imaging unit 11 of the digital microscope 1 images a whole image (dark-field image) with the low magnification and low resolution, the whole image having the same field of view as the bright-field image but including the foreign matter such as the edge of the cover glass covering the specimen in the observation target area (step S1b). Since the imaging condition such as the light source is different from the imaging condition in step S1b described above, the whole image imaging unit 11 can perform imaging such that the foreign matter stands out in the whole image including the specimen and the foreign matter such as the edge of the cover glass. The dark-field image imaged in step S1b is also output from the interface 14 of the digital microscope 1 and input to the image processing unit 23 through the interface 26 of the information processing apparatus 2.

Then, the processing similar to the processing performed in each of step S2a and step S3a is also performed on the dark-field image imaged in step S1b (step S2b and step S3b). In step S2b, the likelihood in each area is calculated by the image recognition processing or the like. In step S3b, the image analysis unit 232 creates a presence map indicating presence information on the foreign matter on the basis of the likelihood in each area. Note that the processing in steps S2b and S3b can be performed concurrently with the processing in steps S2a and S3a after imaging the bright-field image in step S1a and the dark-field image in step S1b.

Next, the image analysis unit 232 corrects the presence map created in step S3a on the basis of the presence map created in step S3b (step S4). FIGS. 6A to 6D and 7A to 7D are diagrams illustrating an overview of the presence map creation processing.

Figure 6:
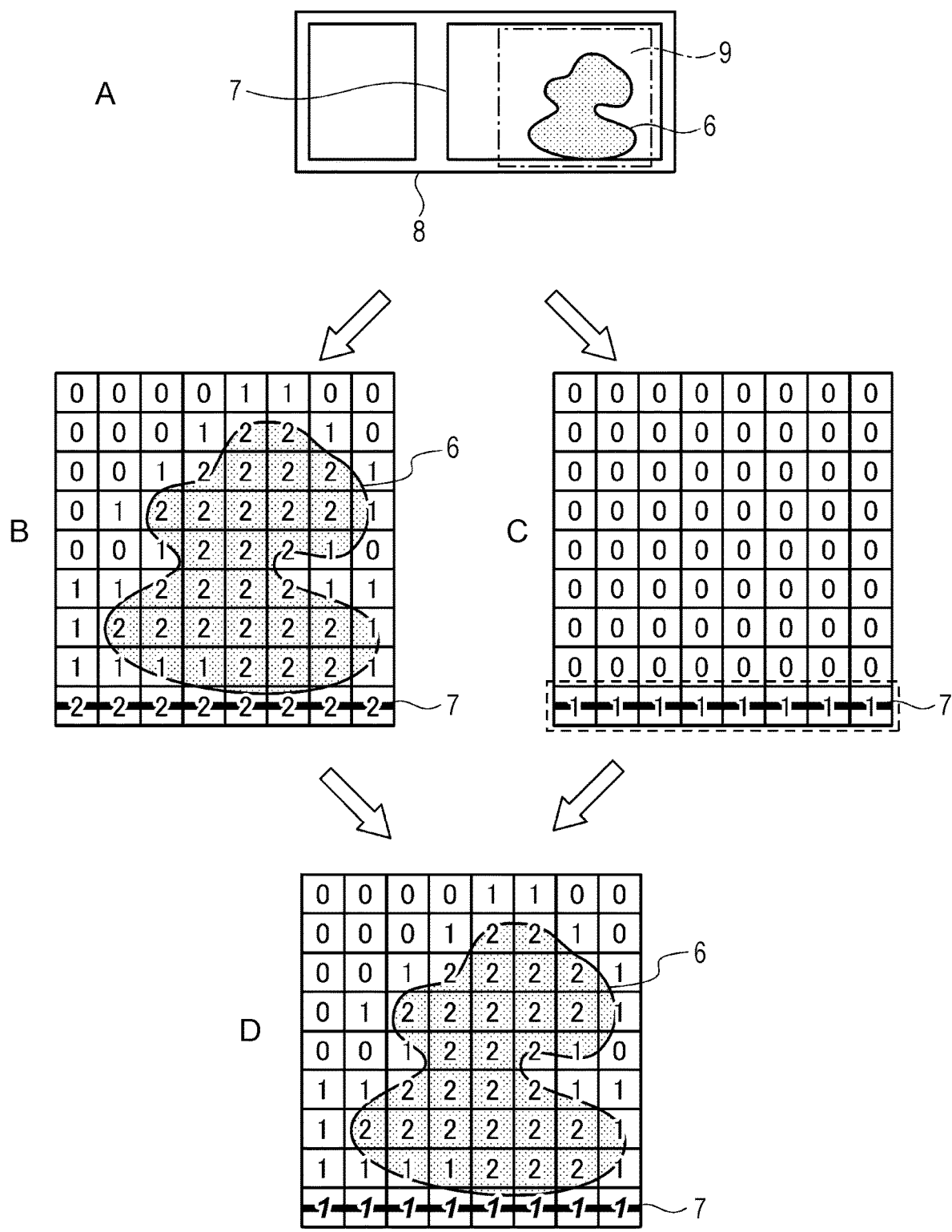
FIGS. 6A to 6D are diagrams illustrating an overview of presence map creation processing performed by an image analysis unit 232.
Figure 7:
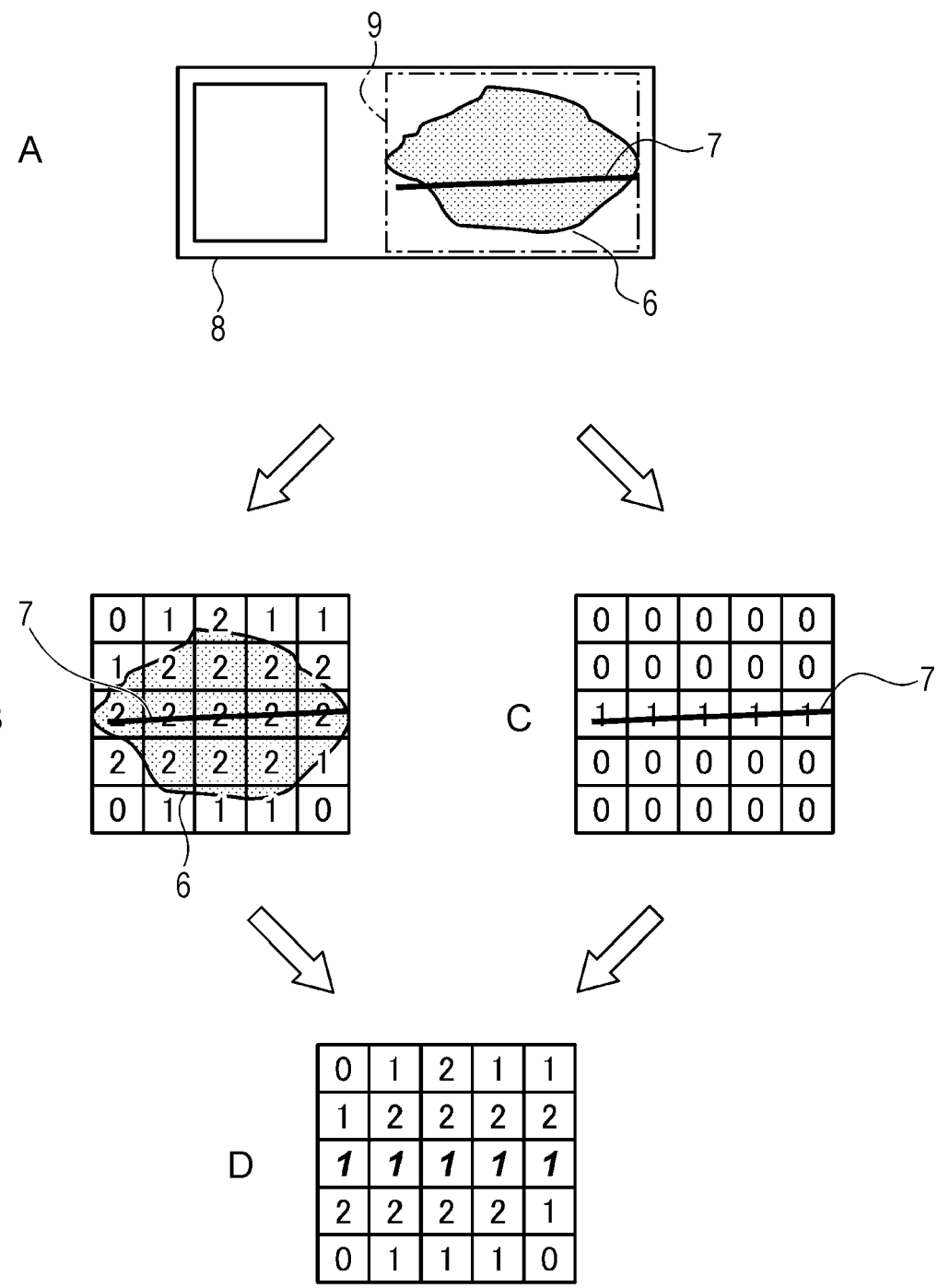
FIGS. 7A to 7D are diagrams illustrating an overview of the presence map creation processing performed by the image analysis unit 232.

As illustrated in FIG. 6A, for example, the whole image imaging unit 11 first images the bright-field image of an observation target 6 and a foreign matter (edge of the cover glass) 7 on a slide glass 8 in an arbitrary observation area 9. Subsequently, as illustrated in FIG. 6B, the image analysis unit 232 classifies each area of the whole image into three levels according to the likelihood, the three levels including the area in which the observation target 6 is present (level 2), the area in which the observation target 6 may be present (level 1), and the area in which the observation target 6 is not present (level 0). At this stage, the presence level of an area in which the observation target 6 or the foreign matter 7 is present is "2".

Next, as illustrated in FIG. 6C, the whole image imaging unit 11 images the dark-field image by changing the imaging condition such as the light source in order to make the foreign matter 7 stand out in the image. Here, the presence level of the area including the foreign matter (edge of the cover glass) 7 is "1" (an encircled part in FIG. 6C). The image analysis unit 232 then corrects the presence map by subtracting the presence map illustrated in FIG. 6C from the presence map illustrated in FIG. 6B, as illustrated in FIG. 6D. As a result, the presence level of the area including the foreign matter 7 becomes "1". The microscope system of the present embodiment performs the processing of correcting the presence map on the basis of the partial image including the foreign matter 7, which is not limited to the cover glass but can also be dirt or the like as illustrated in FIGS. 7A to 7D.

Note that the method of creating and processing the presence map is not limited to the processing method performed in steps S1a, S2a, S3a, S3b, S2b, and S3b described above as long as the microscope system of the present embodiment can perform imaging processing of the partial image in step S5 and stitching processing of the partial images in step S6 that are described below.

Figure 8:
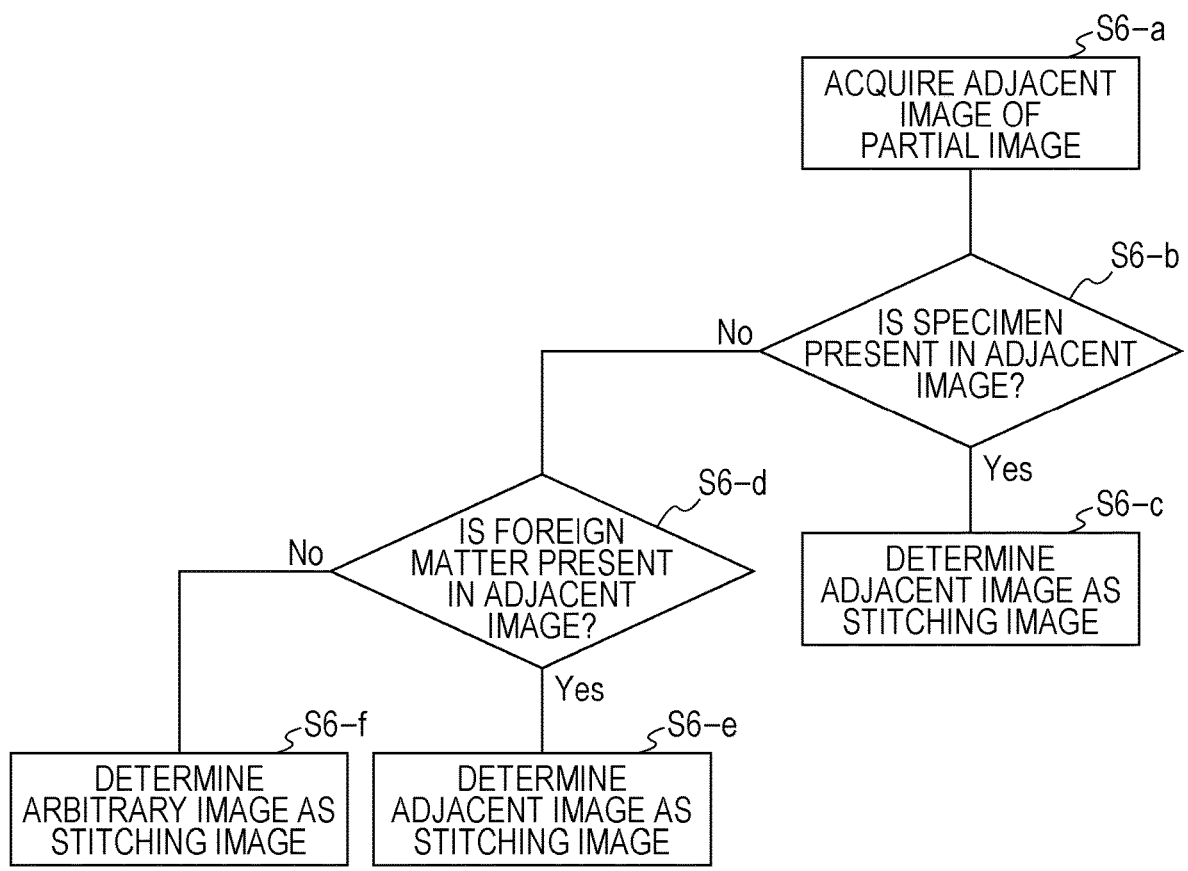
FIG. 8 is a flowchart illustrating a flow of acquiring an image to be stitched to a partial image by an image acquisition unit 233.

Next, the partial image imaging unit 12 of the digital microscope 1 images the partial image (step S5). The image acquisition unit 233 thereafter acquires a partial image to be stitched to each partial image that is imaged (step S6). FIG. 8 is a flowchart illustrating a flow of acquiring the image to be stitched to the partial image.

Specifically, as illustrated in FIG. 8, the image acquisition unit 233 first acquires an arbitrary partial image (the first partial image) (step S6-a). The image acquisition unit 233 preferentially acquires, as the second partial image, a partial image including the specimen when the first partial image includes the foreign matter (steps S6-b and S6-c). The image acquisition unit 233 at this time acquires, as the second partial image, the partial image to be stitched to the first partial image. It is preferred that the image acquisition unit 233 acquires a partial image including the specimen but not including the foreign matter as the second partial image.

When there is no partial image including the specimen among partial images formed by imaging an area adjacent to an imaging area of the partial image including the foreign matter, on the other hand, the image acquisition unit 233 may acquire a partial image including a foreign matter as the partial image to be stitched to the partial image including the aforementioned foreign matter (steps S6-*d* and S6-*e*). When the partial image formed by imaging an area adjacent to the imaging area of the first partial image does not include the specimen or the foreign matter, the image acquisition unit 233 can acquire an arbitrary partial image (step S6-*f*). In this case, the arbitrary partial image may be stitched on the basis of information related to a position in the direction of a stage surface of the digital microscope 1.

Moreover, it is preferred that the image acquisition unit 233 does not acquire, as the partial image to be stitched to the partial image including the foreign matter, the partial image including the foreign matter that is stitched to the partial image including the foreign matter or the partial image including the foreign matter that is stitched on the basis of the position information.

Figure 9:
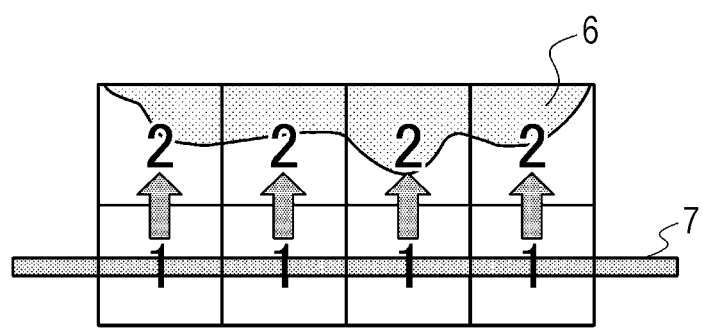
FIG. 9 is a diagram illustrating an overview of the presence map creation processing performed by the image analysis unit 232.

FIG. 9 is a diagram illustrating an overview of the presence map on which the processing illustrated in FIG. 8 is executed. Execution of the processing illustrated in FIG. 8 can prevent the foreign matters (edges of the cover glass) 7 from being stitched to each other, whereby an image including the observation target 6 and an image including the foreign matter 7 can be preferentially stitched together as illustrated in FIG. 9.

Figure 10:
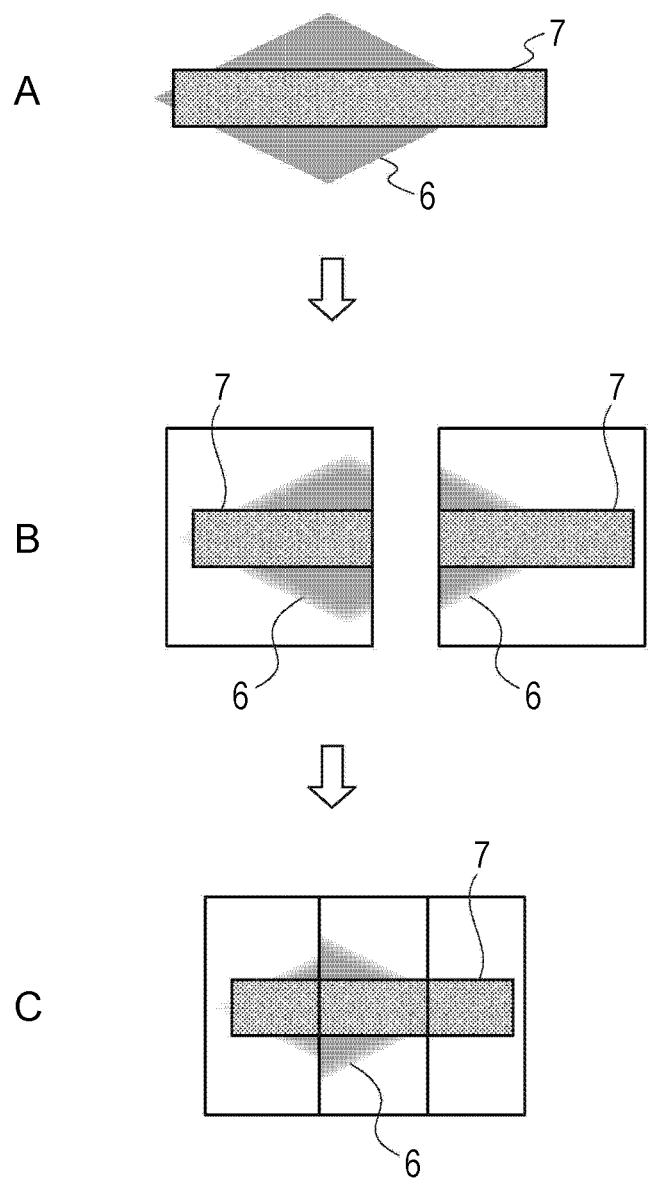
FIGS. 10A to 10C are diagrams illustrating an overview of a state where a specimen and a foreign matter coexist.

Next, the stitching position adjustment unit 234 adjusts the stitching position of the partial image to be stitched (step S7). FIGS. 10A to 10C are diagrams illustrating an overview of a state where the specimen and the foreign matter coexist. The partial image including the foreign matter is controlled to be preferentially stitched to the image including the specimen by executing the processing illustrated in FIG. 9. Accordingly, there can be prevented the shift in the stitching position, as illustrated in FIG. 10C, that tends to occur by stitching together the partial images including the foreign matter, even when the foreign matter 7 such as the cover glass is present on the observation target 6 as illustrated in FIGS. 10A and 10B.

Next, the partial image is output one by one to the information processing apparatus 2 so that the image composition unit 24 performs the stitching processing (step S8). The stitching processing in step S8 may be performed after adjusting the stitching position of the partial image in step S7 and temporarily storing a stitching order (stitching sequence) and the partial image in the memory 22. The shift in the stitching position is less likely to occur when the microscope system of the present embodiment performs the stitching processing because the partial image including the foreign matter is preferentially stitched to the partial image including the specimen even when the foreign matter is present in the observation target area. As a result, the partial images are stitched together with high accuracy to be able to compose the microscopically observed image having the wide field of view and high resolution.

Note that while the bright-field image and the dark-field image are used as the two types of whole images in the microscope system of the present embodiment, the present disclosure is not to be limited to such example.

2. Second Embodiment

Figure 11:
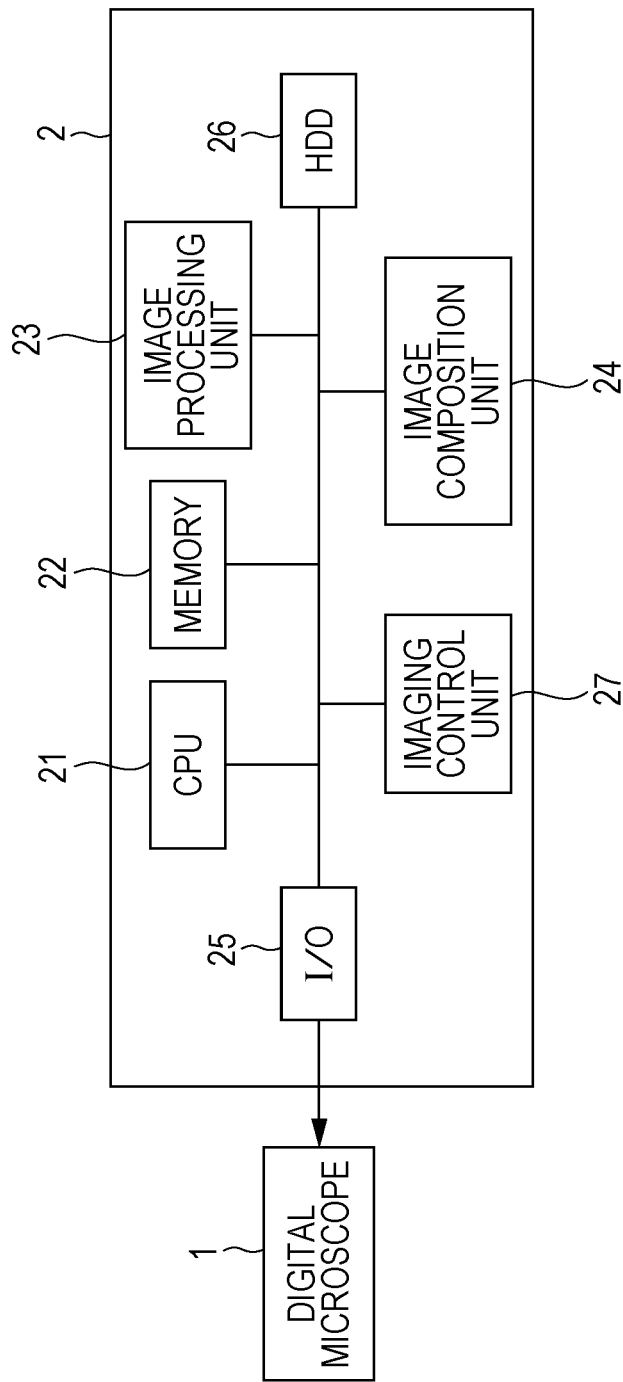
FIG. 11 is a block diagram illustrating an example of a configuration of an information processing apparatus 2 of a microscope system according to second embodiment of the present disclosure.

Next, there will be described a microscope system according to second embodiment of the present disclosure. FIG. 11 is a block diagram illustrating an example of a configuration of an information processing apparatus 2 of the microscope system according to the present embodiment, and FIG. 12 is a block diagram illustrating an example of a configuration of an image processing unit 23 of the information processing apparatus 2.

Figure 12:
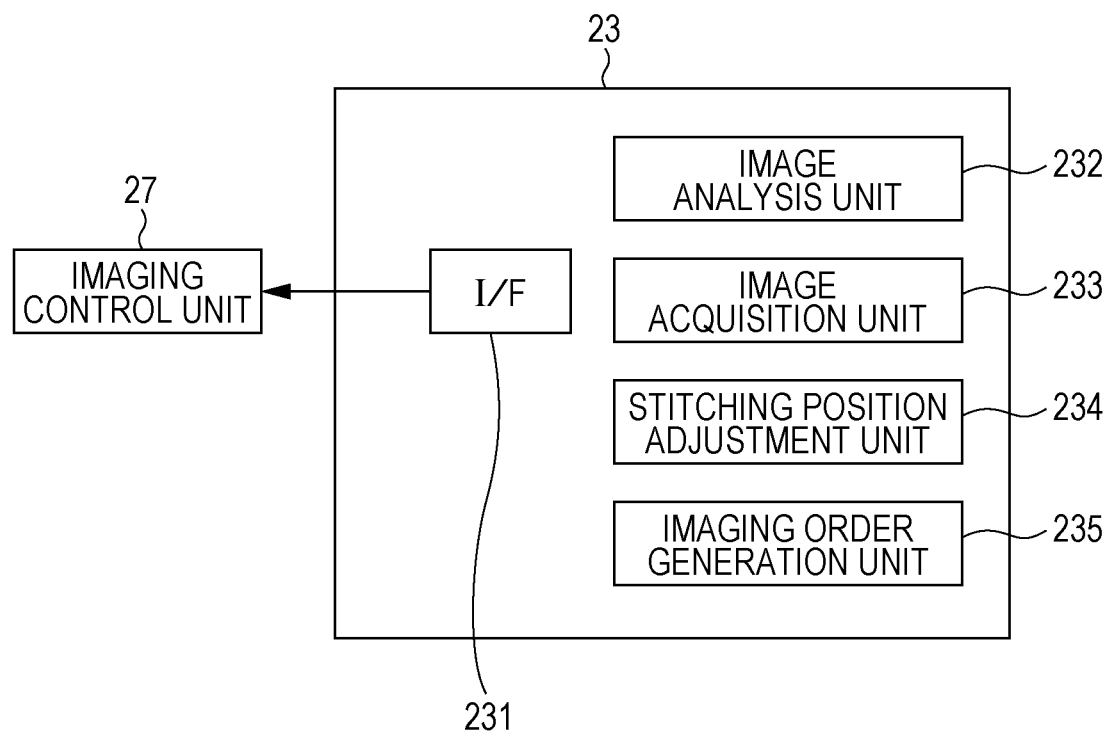
FIG. 12 is a block diagram illustrating an example of a configuration of an image processing unit 23 illustrated in FIG. 11.

As illustrated in FIG. 12, the information processing apparatus 2 of the microscope system according to the present embodiment is provided with at least an imaging order generation unit 235 which creates an imaging order (imaging sequence) of a partial image, an image acquisition unit 233 which acquires a first partial image and a second partial image, and a stitching position adjustment unit 234 which adjusts a stitching position of these partial images. The image acquisition unit 233 acquires the first partial image and the second partial image according to the imaging order (imaging sequence) created by the imaging order generation unit 235.

Moreover, as illustrated in FIG. 11, the information processing apparatus 2 of the microscope system according to the present embodiment includes an imaging control unit 27. The imaging control unit 27 controls drive when a digital microscope 1 images a partial image on the basis of the imaging order (imaging sequence) created by the imaging order generation unit 235.

The imaging order generation unit 235 creates the imaging order (imaging sequence) on the basis of a determination result by an image analysis unit 232, for example. The image analysis unit 232 determines whether or not a foreign matter and a specimen are present in each area of a whole image by employing a method similar to that employed by the image analysis unit 232 in the first embodiment described above. The imaging order generation unit 235 creates the imaging sequence such that an area more likely to include an observation target is imaged before an area likely to include a foreign matter and that a travel distance related to imaging becomes shorter. Note that the imaging order generation unit 235 may create the imaging order on the basis of a likelihood calculated by the image analysis unit 232 and a presence map created by the image analysis unit 232. Moreover, the imaging order (imaging sequence) being created is output to the imaging control unit 27 through an interface 231.

Figure 13:
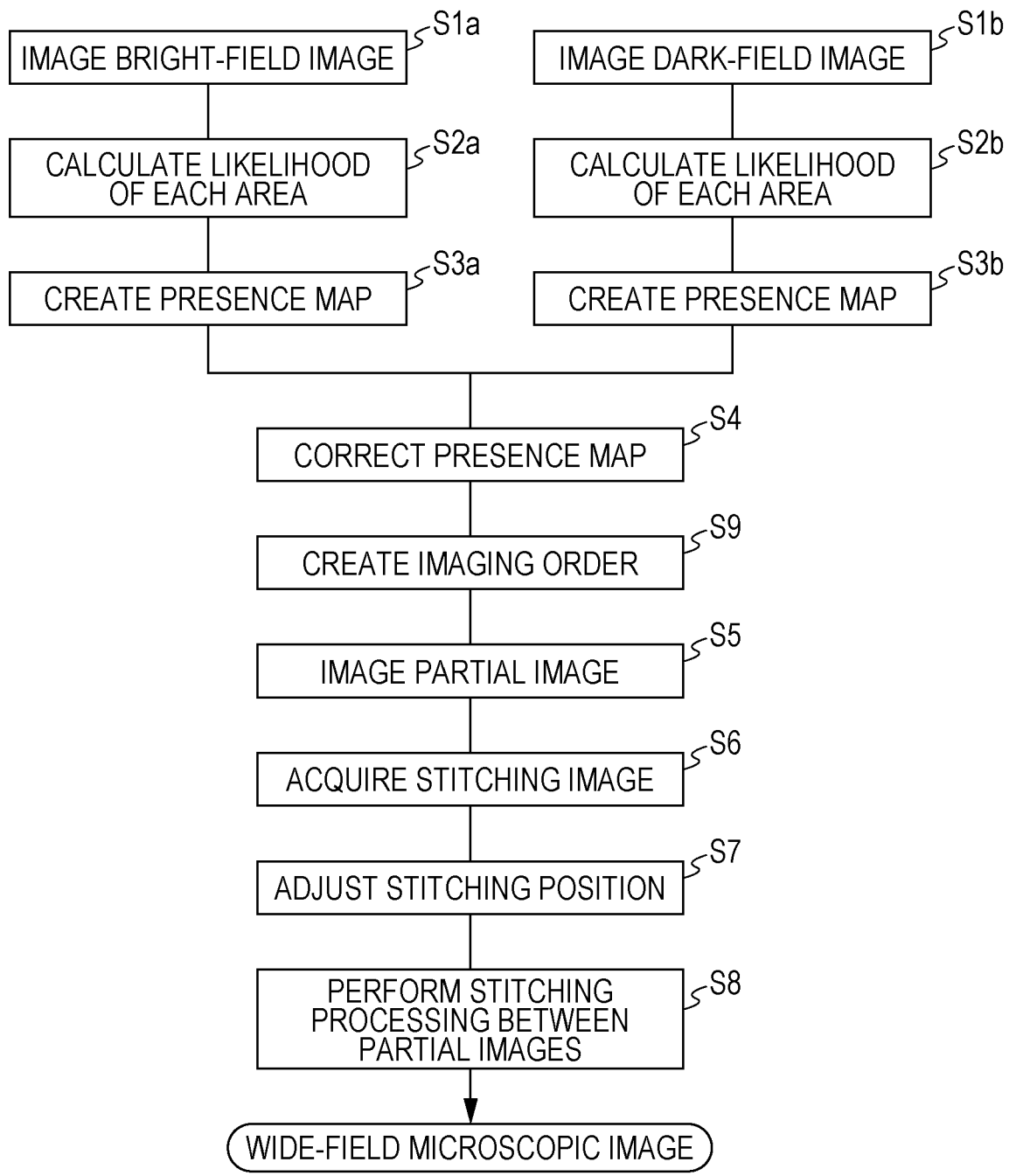
FIG. 13 is a flowchart illustrating an overview of an overall operation of the microscope system according to the second embodiment of the present disclosure.
Figure 14:
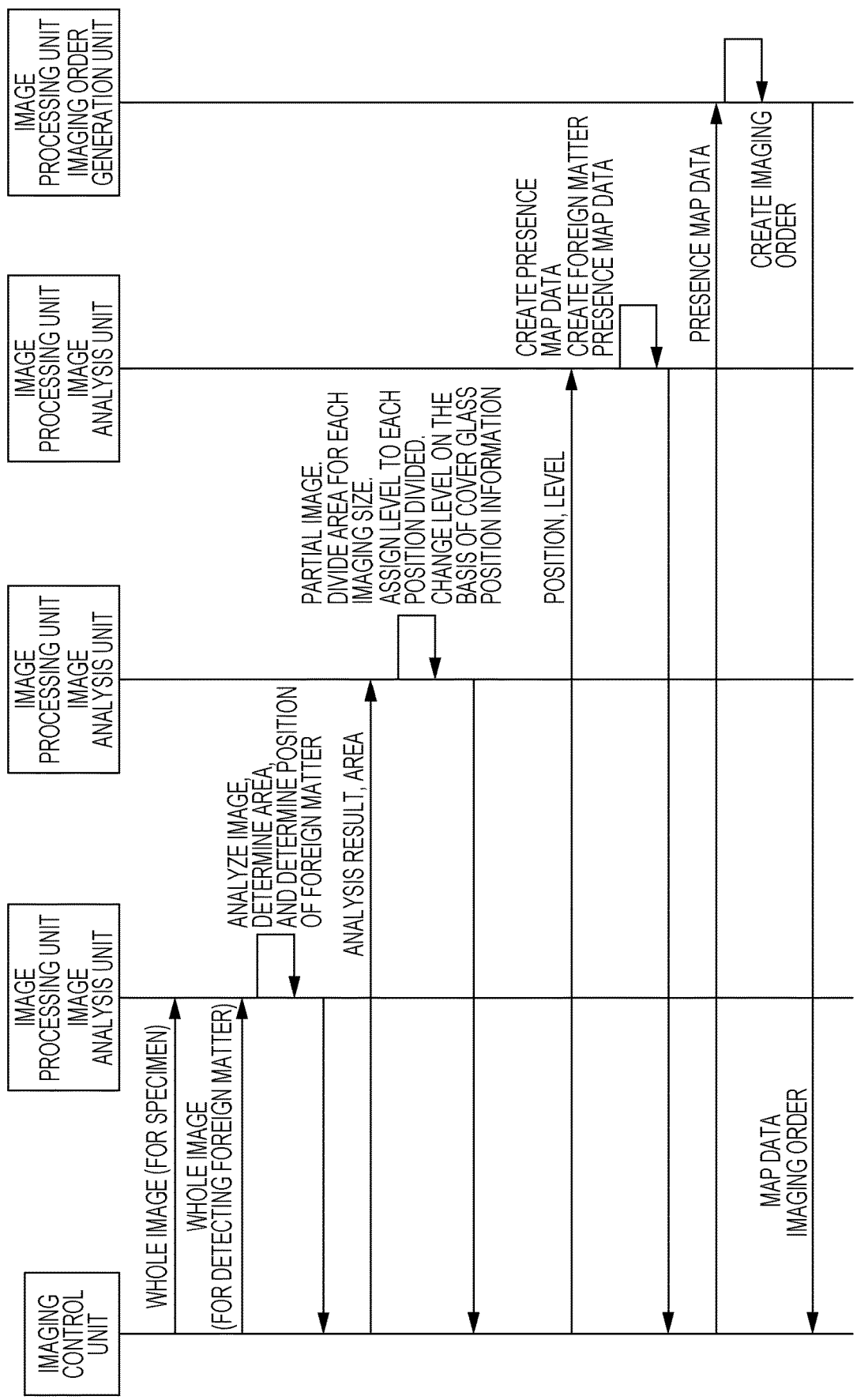
FIG. 14 is a sequence diagram illustrating a flow of processing and data performed/treated by the information processing apparatus 2.

FIG. 13 is a flowchart illustrating an overview of an overall operation of the microscope system according to the present embodiment, and FIG. 14 is a sequence diagram illustrating a flow of processing and data performed/treated by the information processing apparatus 2.

In the microscope system of the present embodiment, the image analysis unit 232 first divides a whole image into a plurality of areas on the basis of a first whole image and a second whole image imaged by a whole image imaging unit 11 and then creates a corrected presence map, as with the first embodiment described above (steps S1*a* to S3*a*, S1*b* to S3*b*, and S4).

Figure 15:
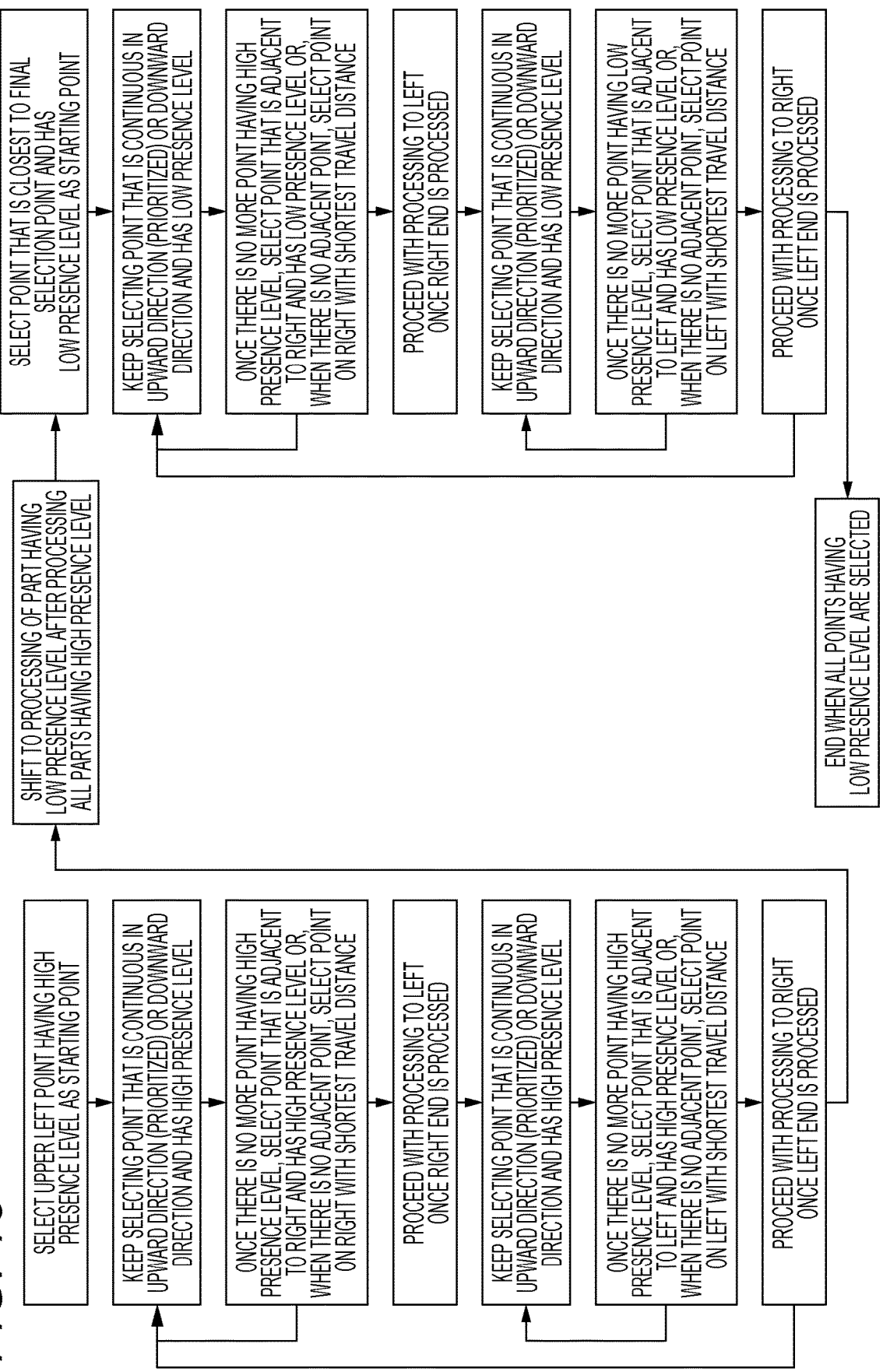
FIG. 15 is a flowchart illustrating a flow of imaging order creation processing performed by the information processing apparatus 2.
Figure 16:
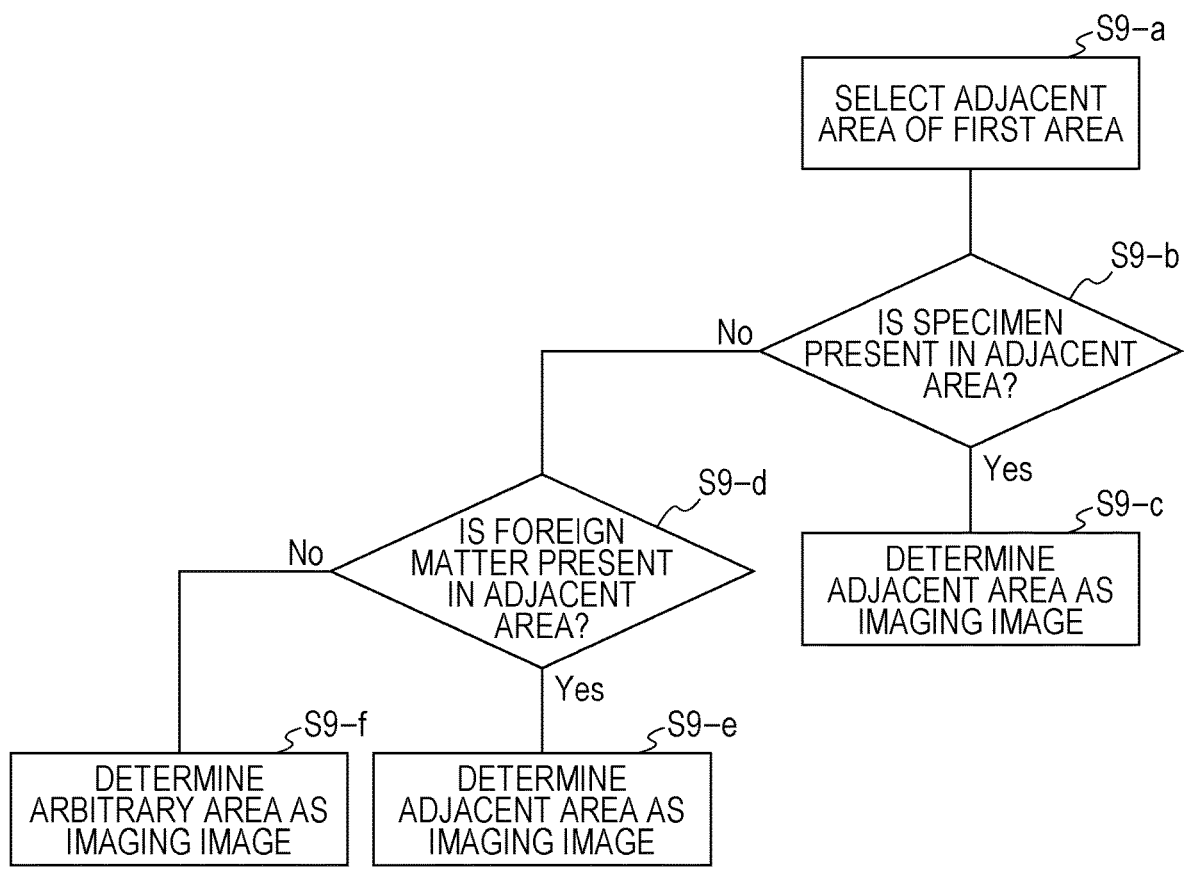
FIG. 16 is a flowchart illustrating a flow of determining an imaging order by an imaging order generation unit 235.
Figure 17:
FIGS. 17A and 17B are diagrams illustrating the imaging order generated by the imaging order generation unit 235.
Figure 17:
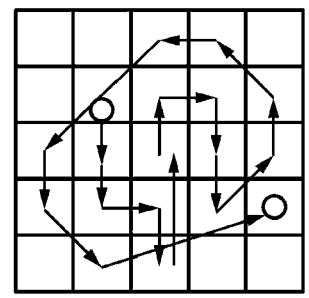

Next, the imaging order generation unit 235 creates the imaging order (imaging sequence) of a partial image on the basis of the corrected presence map (step S9). FIG. 15 is a flowchart illustrating a flow of the imaging order creation processing performed by the information processing apparatus 2 in more detail. FIG. 16 is a flowchart illustrating a flow of determining the imaging order by the imaging order generation unit 235. FIGS. 17A and 17B are diagrams illustrating the imaging order created by the imaging order generation unit 235.

As illustrated in FIG. 15, the imaging order (imaging sequence) is created such that an area having a higher likelihood (presence level) is imaged first to make a travel distance shorter, for example.

At that time, the microscope system of the present embodiment can create the imaging order in more detail when a foreign matter is present within an observation target area. Specifically, as illustrated in FIG. 16, the imaging order generation unit 235 first selects an area (first area) to be imaged first (step S9-a). The imaging order generation unit 235 preferentially selects an area including a specimen as an area (second area) to be imaged after the first area, when the foreign matter is present in the first area (steps S9-b and S9-c). It is preferred that the imaging order generation unit 235 selects an area including the specimen but not including the foreign matter as the second area.

When there is no area including the specimen among areas adjacent to the area including the foreign matter, on the other hand, the imaging order generation unit 235 may select an area including a foreign matter as the area imaged after the area including the foreign matter (steps S9-d and S9-e). When neither the specimen nor the foreign matter is present in the area adjacent to the imaging area of the first area, the imaging order generation unit 235 can select an arbitrary area as the area imaged after the first area (step S9-f). In this case, the arbitrary area may be determined on the basis of information pertaining to a position in the direction along a stage surface of the digital microscope 1.

It is further preferred that the imaging order generation unit 235 does not select, as the area imaged after the area including the foreign matter, the area which is selected as the area including either the specimen or the foreign matter or the area which is selected on the basis of the position information. An imaging order as illustrated in FIG. 17B is created when a presence map as illustrated in FIG. 17A is created, for example.

Subsequently, as illustrated in FIG. 14, the imaging order (imaging sequence) created by the imaging order generation unit 235 is output to the imaging control unit 27 through an interface 231, and the imaging control unit 27 controls drive of the digital microscope 1 on the basis of the imaging order. Then, in the microscope system of the present embodiment, a partial image imaging unit 12 of the digital microscope 1 images a partial image on the basis of the imaging order (step S5).

Next, the image acquisition unit 233 acquires the first partial image and the second partial image according to the imaging order created by the imaging order generation unit 235 to perform adjustment of a stitching position, image composition, and the like (steps S6 to S8). When the foreign matter is present in the first area, the imaging order generation unit 235 of the microscope system of the present embodiment creates the imaging order such that the second area corresponds to the area including the specimen, and thus the image acquisition unit 233 acquires a plurality of the partial images imaged in accordance with the order.

The shift in the stitching position is less likely to occur when the microscope system of the present embodiment performs the stitching processing because the imaging order is created such that the area including the foreign matter is imaged after the area including the specimen to perform the stitching processing in that order even when the foreign matter is present in the observation target area. As a result, the partial images are stitched together with high accuracy to be able to compose the microscopically observed image having the wide field of view and high resolution. Moreover, the data volume in the microscope system can be held down since the microscope system of the present embodiment can perform the stitching processing without storing the plurality of partial images being imaged in a memory 22. Furthermore, the microscope system of the present embodiment can cut down the time required to perform the processing after imaging.

(Variation)

Figure 18:
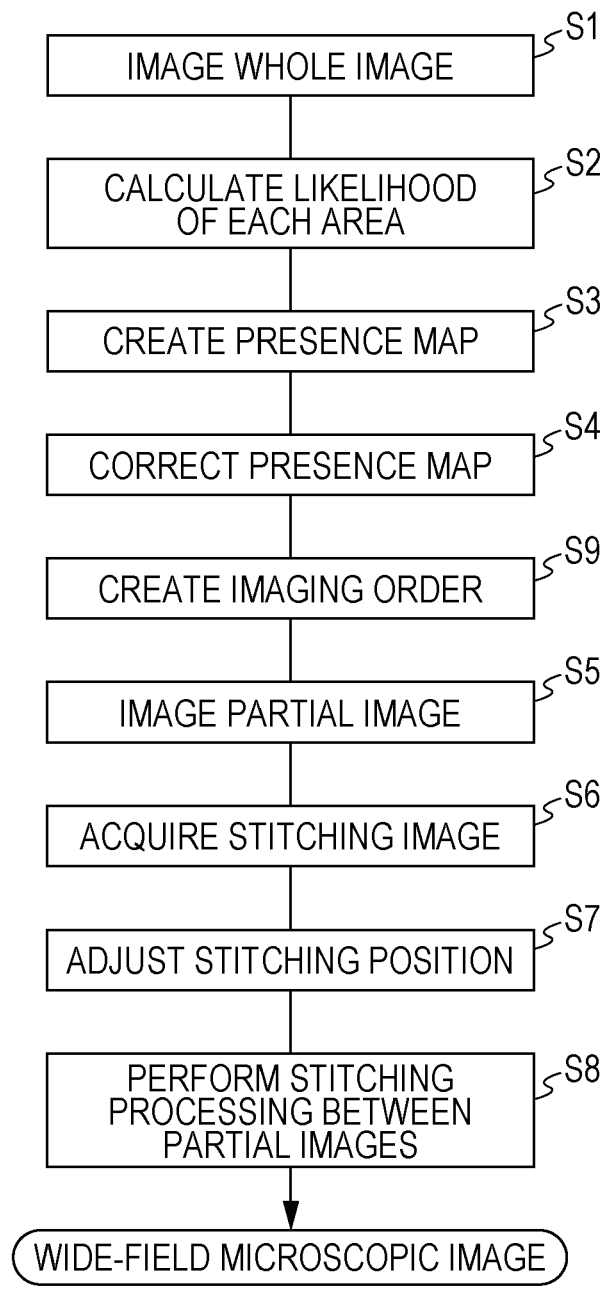
FIG. 18 is a flowchart illustrating an overview of an overall operation of a microscope system according to variation of the second embodiment of the present disclosure.

A microscope system according to variation of the second embodiment of the present disclosure can determine whether or not a foreign matter and a specimen are present by using one type of whole image. FIG. 18 is a flowchart illustrating an overview of an overall operation of the microscope system according to the present variation.

In the microscope system of the present variation, an image analysis unit 232 determines the presence of the foreign matter and the specimen from the one type of whole image that is imaged by a whole image imaging unit 11. Although not particularly limited, a method of calculating a likelihood indicating a possibility of presence of an observation target in each area, for example, can be adopted as the method performed by the image analysis unit 232 to determine whether or not the foreign matter and the specimen are present.

More specifically, the image analysis unit 232 can distinguish the foreign matter and the specimen from an image imaged by the whole image imaging unit 11, divide a whole image into a plurality of areas corresponding to a partial image, and calculate for each area a first likelihood indicating a degree of presence of the specimen and a second likelihood indicating a probability of presence of the foreign matter. The method of distinguishing the foreign matter and the specimen by the one type of whole image is performed on the basis of information such as brightness or shape of the foreign matter and the specimen stored in advance in a memory. The image analysis unit 232 can then create a presence map indicating presence information on the specimen and the foreign matter, on the basis of the first likelihood and the second likelihood of each area.

Note that the image analysis unit 232 may create two types of presence maps from the one type of whole image and correct those presence maps, the two types of presence maps including a presence map indicating the presence information on the specimen and the foreign matter and a presence map indicating the presence information on the foreign matter.

Accordingly, the foreign matter and the specimen are distinguished by means of the one type of whole image to be able to preferentially image an area including an observation target 6 and then image an area including a foreign matter 7 later, even when the foreign matter is present in the observation target area. The microscope system of the present variation can also cut down the time required to complete the whole process by cutting down the time to image the image and the time required to perform the processing after the imaging. Note that the configuration and effect of the microscope system of the present variation other than what has been described are similar to that of the second embodiment described above.

The present disclosure can also have the following configuration.

(1)

An information processing apparatus including:

an image acquisition unit which acquires a first partial image and a second partial image each formed by imaging a part of an observation target area; and a stitching position adjustment unit which adjusts a stitching position between the first partial image and the second partial image, wherein the image acquisition unit acquires a partial image including a specimen as the second partial image when a foreign matter is included in the first partial image.

(2)

The information processing apparatus according to (1), including an imaging order generation unit which generates an imaging order of the partial image on the basis of a whole image formed by imaging the entire observation target area with a lower magnification than the partial image, wherein the imaging order generation unit selects an area including a specimen as a second area imaged after a first area when a foreign matter is included in the first area of the whole image that is divided into a plurality of areas, and the image acquisition unit acquires the first partial image and the second partial image according to the imaging order generated by the imaging order generation unit.

(3)

The information processing apparatus according to (1), wherein the image acquisition unit acquires the second partial image to be stitched to the first partial image from a plurality of the partial images each formed by imaging a part of the observation target area, and the stitching position adjustment unit adjusts a stitching position of the second partial image with respect to the first partial image.

(4)

The information processing apparatus according to any of (1) to (3), wherein the image acquisition unit acquires a partial image not including a foreign matter as the second partial image.

(5)

The information processing apparatus according to any of (1) to (4), wherein the image acquisition unit acquires a partial image including a foreign matter as the second partial image when none of the partial images formed by imaging an area adjacent to an imaging area of the first partial image includes a specimen.

(6)

The information processing apparatus according to any of (1) to (5), where the image acquisition unit does not acquire, as the second partial image, a partial image including a foreign matter which is stitched to a partial image including a foreign matter.

(7)

The information processing apparatus according to any of (1) to (6), further including an image analysis unit which determines whether or not a foreign matter and a specimen are present in the partial image.

(8)

The information processing apparatus according to (7), wherein the image analysis unit determines whether or not the foreign matter and the specimen are present in each of a plurality of areas of the whole image to make a determination on a corresponding partial image on the basis of a result of the determination.

(9)

The information processing apparatus according to (7) or (8), wherein the image analysis unit determines whether or not the foreign matter and the specimen are present by using two types of whole images having the same field of view but different imaging conditions.

(10)

The information processing apparatus according to (8) or (9), wherein the image analysis unit divides the whole image into a plurality of areas corresponding to the partial image and calculates, for each area, a first likelihood indicating a degree of presence of the specimen and a second likelihood calculating a probability of presence of the foreign matter.

(11)

The information processing apparatus according to (10), wherein the image analysis unit creates a presence map indicating presence information on the specimen and the foreign matter, on the basis of the first likelihood and the second likelihood.

(12)

The information processing apparatus according to any of (1) to (11), further including an image composition unit which stitches together the first partial image and the second partial image.

(13)

The information processing apparatus according to (12), wherein the image acquisition unit acquires as the second partial image an arbitrary partial image from among the partial images when none of the partial images formed by imaging the area adjacent to the imaging area of the first partial image includes the specimen nor the foreign matter, and the image composition unit stitches the second partial image to the first partial image on the basis of position information of the acquired partial image at the time of imaging.

(14)

The information processing apparatus according to (13), where the image acquisition unit does not acquire, as the second partial image, a partial image which is stitched on the basis of the position information.

(15)

An information processing method including:

an image acquisition step in which an image acquisition unit acquires a first partial image and a second partial image each formed by imaging a part of an observation target area; and a stitching position adjustment step in which a stitching position adjustment unit adjusts a stitching position between the first partial image and the second partial image, wherein, in the image acquisition step, a partial image including a specimen is acquired as the second partial image when a foreign matter is included in the first partial image.

(16)

A program which causes an information processing apparatus to execute:

an image acquisition function of acquiring a first partial image and a second partial image, each formed by imaging a part of an observation target area, such that a partial image including a specimen is acquired for a partial image including a foreign matter; and a stitching position adjustment function of adjusting a stitching position between the first partial image and the second partial image.

(17)

A microscope system which includes at least:

a microscope apparatus including at least:

a whole image imaging unit which images a whole observation target area; and a partial image imaging unit which images a part of the observation target area with a higher magnification than the whole image; and an information processing apparatus which controls the microscope apparatus as well as processes each image imaged by the microscope apparatus, wherein the information processing apparatus is provided with:

an image acquisition unit which acquires a first partial image and a second partial image from a plurality of partial images each formed by imaging a part of the observation target area; and a stitching position adjustment unit which adjusts a stitching position between the first partial image and the second partial image, and the image acquisition unit acquires a partial image including a specimen as the second partial image when a foreign matter is included in the first partial image.

REFERENCE SIGNS LIST

1 Digital microscope
2 Information processing apparatus
3 Server
4 Image display device
5 Network
6 Observation target
7 Foreign matter
8 Slide glass
11 Whole image imaging unit
12 Partial image imaging unit
13 Imaging device controller
14, 25, 231 Interface
21 CPU
22 Memory
23 Image processing unit
24 Image composition unit
26 Hard disk
27 Imaging control unit
232 Image analysis unit
233 Image acquisition unit
234 Stitching position adjustment unit
235 Imaging order generation unit

The invention claimed is:

1. An information processing apparatus, comprising:
a memory; and
circuitry configured to:
 obtain a first image and a second image, wherein
  the first image is obtained based on irradiation of an observation target area with bright-field illumination light,
  the second image is obtained based on irradiation of the observation target area with dark-field illumination light, and
  the observation target area includes a plurality of small areas;
 identify a specimen and a foreign matter in the plurality of small areas of the observation target area based on the first image and the second image;
 determine an imaging order of the plurality of small areas of the observation target area based on the identification of the specimen and the foreign matter in the plurality of small areas of the observation target area;
 obtain a first partial image of the observation target area and a second partial image of the observation target area based on the imaging order; and
 stitch the first partial image and the second partial image.

2. The information processing apparatus according to claim 1, wherein a first magnification of each of the first image and the second image of the observation target area is lower than a second magnification of each of the first partial image and the second partial image.

3. The information processing apparatus according to claim 1, wherein
the circuitry is further configured to obtain, as the second partial image, a partial image of a first small area of the plurality of small areas, and
the specimen is present in the first small area and the foreign matter is absent in the first small area.

4. The information processing apparatus according to claim 1, wherein
the circuitry is further configured to obtain, as the second partial image, a partial image of a first small area of the plurality of small areas, and
the specimen is absent in the first small area and the foreign matter is present in the first small area.

5. The information processing apparatus according to claim 4, wherein
the circuitry is further configured to stitch the second partial image to a third partial image,
the third partial image is a partial image of a second small area of the plurality of small areas of the observation target area, and
the foreign matter is absent in the second small area.

6. The information processing apparatus according to claim 1, wherein
the first partial image is associated with a first small area of the plurality of small areas and the second partial image is associated with a second small area of the plurality of small areas, and
at least one of the foreign matter or the specimen is present in each of the first small area and the second small area.

7. The information processing apparatus according to claim 1, wherein
the first image and the second image have same field of views.

8. The information processing apparatus according to claim 1, wherein the circuitry is further configured to:
 calculate a probability of presence of the specimen in each of the first image and the second image; and
 calculate a probability of presence of the foreign matter in each of the first image and the second image.

9. The information processing apparatus according to claim 8, wherein the circuitry is further configured to create a presence map that indicates presence information of the specimen and the foreign matter based on the probability of the presence of the specimen and the probability of the presence of the foreign matter.

10. The information processing apparatus according to claim 1, wherein the circuitry is further configured to:
 obtain, as an arbitrary partial image, a partial image of an arbitrary area of the observation target area, wherein
  each of the specimen and the foreign matter is absent in the arbitrary area, and
  the arbitrary area is adjacent to a first area associated with the first partial image; and
 stitch the arbitrary partial image to the first partial image based on position information of the arbitrary partial image.

11. The information processing apparatus according to claim 1, wherein
the first partial image is associated with a first small area of the plurality of small areas, and
the circuitry is further configured to:
 obtain, as the second partial image, a partial image of a second small area of the plurality of small areas adjacent to the first small area when the specimen is present in the second small area and the foreign matter is absent in the second small area;
 obtain, as the second partial image, a partial image of the third small area of the plurality of small areas adjacent to the first small area when the specimen is absent in the second small area, the foreign matter is present in the third small area, and the specimen is absent in the third small area.

12. The information processing apparatus according to claim 1, wherein
the foreign matter excludes the specimen, and
the foreign matter includes at least one of a cover glass or dirt.

13. The information processing apparatus according to claim 1, wherein
the circuitry is further configured to classify each of the plurality of small areas into one of a first area in which the specimen is present, a second area in which the specimen may be present, or a third area in which the specimen is absent.

14. The information processing apparatus according to claim 1, wherein
the circuitry is further configured to identify the specimen and the foreign matter in each of the plurality of small areas.

15. The information processing apparatus according to claim 14, wherein the circuitry is further configured to generate a presence map that indicates presence information of the specimen and the foreign matter based on the identification of the specimen and the foreign matter in each of the plurality of small areas.

16. The information processing apparatus according to claim 14, wherein the circuitry is further configured to:
calculate a probability of presence of the specimen in each of the plurality of small areas; and
identify the specimen in each of the plurality of small areas based on the calculated probability.

17. The information processing apparatus according to claim 16, wherein
the circuitry is further configured to determine the imaging order such that the first partial image of a first small area of the plurality of small areas is obtained prior to the second partial image of a second small area of the plurality of small areas, and
the probability of the presence of the specimen in the first small area is higher the probability of the presence of the specimen in the second small area.

18. The information processing apparatus according to claim 1, wherein the circuitry is further configured to stitch the first partial image and the second partial image based on adjustment of a stitching position.

19. The information processing apparatus according to claim 1, wherein the circuitry is further configured to stitch the first partial image and the second partial image based on a comparison of luminance values of at least two pixels in a first stitching region of the first partial image and a second stitching region of the second partial image.

20. The information processing apparatus according to claim 1, wherein the circuitry is further configured to determine the imaging order of the plurality of small areas of the observation target area such that a travel distance of an imaging device over the observation target area is reduced.

21. An information processing method, comprising:
obtaining a first image and a second image, wherein
the first image is obtained based on irradiation of an observation target area with bright-field illumination light,
the second image is obtained based on irradiation of the observation target area with dark-field illumination light, and
the observation target area includes a plurality of small areas;
identifying a specimen and a foreign matter in the plurality of small areas of the observation target area based on the first image and the second image;
determining an imaging order the plurality of small areas of the observation target area based on the identification of the specimen and the foreign matter in the plurality of small areas of the observation target area;
obtaining a first partial image of the observation target area and a second partial image of the observation target area based on the imaging order; and
stitching the first partial image and the second partial image.

22. The information processing method according to claim 21, wherein
the foreign matter excludes the specimen, and
the foreign matter includes at least one of a cover glass or dirt.

23. The information processing method according to claim 21, wherein
the observation target area includes a plurality of small areas, and
the information processing method further comprises classifying each of the plurality of small areas into one of a first area in which the specimen is present, a second area in which the specimen may be present, or a third area in which the specimen is absent.

24. The information processing method according to claim 21, wherein
the observation target area includes a plurality of small areas, and
the information processing method further comprises identifying the specimen and the foreign matter in each of the plurality of small areas.

25. The information processing method according to claim 24, further comprising generating a presence map that indicates presence information of the specimen and the foreign matter based on the identification of the specimen and the foreign matter in each of the plurality of small areas.

26. The information processing method according to claim 24, further comprising:
calculating a probability of presence of the specimen in each of the plurality of small areas; and
identifying the specimen in each of the plurality of small areas based on the calculated probability.

27. The information processing method according to claim 26, further comprising determining the imaging order such that a first small area of the plurality of small areas is obtained prior to a second small area of the plurality of small areas,
wherein the probability of the presence of the specimen in the first small area is higher the probability of the presence of the specimen in the second small area.

28. The information processing method according to claim 21, further comprising stitching the first partial image and the second partial image by adjusting a stitching position.

29. The information processing method according to claim 21, further comprising stitching the first partial image and the second partial image based on a comparison of luminance values of at least two pixels in a first stitching region of the first partial image and a second stitching region of the second partial image.

30. The information processing method according to claim 21, further comprising determining the imaging order of the plurality of small areas of the observation target area such that a travel distance of an imaging device over the observation target area is reduced.

31. A non-transitory computer-readable medium, having stored thereon computer-readable instructions, which when executed by a computer, cause the computer to execute operations, the operations comprising:

obtaining a first image and a second image, wherein
the first image is obtained based on irradiation of an observation target area with bright-field illumination light,
the second image is obtained based on irradiation of the observation target area with dark-field illumination light, and
the observation target area includes a plurality of small areas;

identifying a specimen and a foreign matter in the plurality of small areas of the observation target area based on the first image and the second image;

determining an imaging order of the plurality of small areas of the observation target area based on the identification of the specimen and the foreign matter in the plurality of small areas of the observation target area;

obtaining a first partial image of the observation target area and a second partial image of the observation target area based on the imaging order; and stitching the first partial image and the second partial image.

32. An information processing system, comprising:

an image providing device configured to provide a first image and a second image, wherein
the first image is acquired based on irradiation of an observation target area with bright-field illumination light,
the second image is acquired based on irradiation of the observation target area with dark-field illumination light, and
the observation target area includes a plurality of small areas;

processing circuitry controlled by executable code; and a memory configured to store the executable code which, when read by the processing circuitry, cause the processing circuitry to:
obtain the first image and the second image;
identify a specimen and a foreign matter in the plurality of small areas of the observation target area based on the first image and the second image;
determine an imaging order of the plurality of small areas of the observation target area based on the identification of the specimen and the foreign matter in the plurality of small areas of the observation target area;
obtain a first partial image of the observation target area and a second partial image of the observation target area based on the imaging order; and
stitch the first partial image and the second partial image.

33. The information processing system according to claim 32, wherein
the foreign matter excludes the specimen, and
the foreign matter includes at least one of a cover glass or dirt.

34. The information processing system according to claim 32, wherein
the observation target area includes a plurality of small areas, and
the executable code which, when read by the processing circuitry, further cause the processing circuitry to classify each of the plurality of small areas into one of a first area in which the specimen is present, a second area in which the specimen may be present, or a third area in which the specimen is absent.

35. The information processing system according to claim 32, wherein
the observation target area includes a plurality of small areas, and
the executable code which, when read by the processing circuitry, further cause the processing circuitry to identify the specimen and the foreign matter in each of the plurality of small areas.

36. The information processing system according to claim 35, wherein the executable code which, when read by the processing circuitry, further cause the processing circuitry to generate a presence map that indicates presence information of the specimen and the foreign matter based on the identification of the specimen and the foreign matter in each of the plurality of small areas.

37. The information processing system according to claim 35, wherein the executable code which, when read by the processing circuitry, further cause the processing circuitry to:
calculate a probability of presence of the specimen in each of the plurality of small areas; and
identify the specimen in each of the plurality of small areas based on the calculated probability.

38. The information processing system according to claim 37, wherein
the executable code which, when read by the processing circuitry, further cause the processing circuitry to determine the imaging order such that a first small area of the plurality of small areas is obtained prior to a second small area of the plurality of small areas, and
the probability of the presence of the specimen in the first small area is higher the probability of the presence of the specimen in the second small area.

39. The information processing system according to claim 32, wherein the executable code which, when read by the processing circuitry, further cause the processing circuitry to stitch the first partial image and the second partial image based on adjustment of a stitching position.

40. The information processing system according to claim 32, wherein the executable code which, when read by the processing circuitry, further cause the processing circuitry to stitch the first partial image and the second partial image based on a comparison of luminance values of at least two pixels in a first stitching region of the first partial image and a second stitching region of the second partial image.

41. The information processing system according to claim 32, wherein the executable code which, when read by the processing circuitry, further cause the processing circuitry to determine the imaging order of the plurality of small areas of the observation target area such that a travel distance of an imaging device over the observation target area is reduced.

* * * * *